United States Patent [19]

Kawanabe et al.

[11] 3,872,289

[45] Mar. 18, 1975

[54] DEVICE FOR FEEDING OUT DATA WITH CLASSIFYING FUNCTION

[75] Inventors: Tsuyoshi Kawanabe, Yokohama; Minoru Machida, Tokyo, both of Japan

[73] Assignee: Canon Kabushiki Kaisha, Tokyo, Japan

[22] Filed: May 15, 1973

[21] Appl. No.: 360,588

[30] Foreign Application Priority Data

May 22, 1972 Japan .............................. 47-51094

[52] U.S. Cl. ............................................... 235/152

[51] Int. Cl. .......................................... G06k 15/00

[58] Field of Search ........... 235/155, 152, 156, 160, 235/164; 340/172.5, 324, 325, 327

[56] References Cited

UNITED STATES PATENTS

| | | | |
|---|---|---|---|
| 3,040,984 | 6/1962 | Cox et al. | 235/153 |
| 3,074,635 | 1/1963 | Borne et al. | 235/156 |
| 3,537,073 | 10/1970 | Sakoda et al. | 340/172.5 |
| 3,571,808 | 2/1971 | Washizuak et al. | 340/172.5 |
| 3,621,219 | 11/1971 | Washizuka et al. | 235/170 |

*Primary Examiner*—Harvey E. Springborn
*Assistant Examiner*—Michael Sachs
*Attorney, Agent, or Firm*—Fitzpatrick, Cella, Harper & Scinto

[57] ABSTRACT

There is provided a device for feeding out data, while classifying the data according to the kind thereof for use in a calculator. The device comprises a data output means for feeding out data, data storing means, discrimination means for discriminating the data whether the data are of one kind or of the other kind, and shifting means for shifting the data to be fed out up to the most significant digit or the least significant digit of the data output means depending upon the kinds of the data to be fed out.

6 Claims, 4 Drawing Figures

DEVICE FOR FEEDING OUT DATA WITH CLASSIFYING FUNCTION

BACKGROUND OF THE INVENTION

1. Field of the Invention

This invention relates to an output device for calculators, more particularly to an output device for feeding out data classifying the data.

2. Description of the Prior Art

In the electronic desk top calculator and the like, informations or data for display and printing are usually stored in the register taking the least significant digit as the criterion. Therefore, in displaying or printing (output) likewise the least significant digit is taken as the criterion similary.

Accordingly, the data given out similarly take the least significant digit as the criterion. Therefore, classification of the data depending on the mode of output has been impossible.

As a result a method which has been used for discriminating the plural data printed on the recording paper is a system in which a mark indicating the kind of data is printed in a specified place other than the data printing point.

For instance, there has been provided in advance a special data digit section (e.g., 15 digits) for printing the data and, in this data digit section the least significant digit of each of all kinds of data is aligned, that is, printing is made taking the least significant digit as the criterion and a special marking digits (e.g. 2 digits) are provided in addition to the said data section and by adding a special mark indicating the kind of data, discrimination of data has been enabled.

Though such a method enables discrimination of a number of data, as it requires provision of a digit or digits for marking purpose in addition to the data digit section, a large sized printing device is necessitated.

As an alternative a method in which printing of data is performed aligning the least significant digit and changing the printing color depending on the kinds of data is known. For example, it can be considered that the operands and operated numbers are printed in black while the operational result in green. However, in such a method a mechanism for changing the color has to be added to the printing device resulting in a large size of device.

SUMMARY OF THE INVENTION

Accordingly the present invention aims at providing a device with a simple mechanism enabling to classify the data so as to feed out data classifying according to the kind thereof.

Another object of the present invention aims at providing a device which feeds out data classifying the data depending upon the kind of the data requiring no provision of digits for printing special marks in classifying the data.

Still another object of the present invention aims at providing a device for feeding out data classifying the data, in that, in an output device which feeds out data by printing, even if data of different kinds are printed in the same color, the data can be classified sufficiently.

Still other object of the present invention aims at providing a device which feeds out data classifying the data and which is also applicable to an optical device which displays the data by electroluminescent elements or a recording output device which feeds out data by printing.

Further object of the present invention aims at providing a device which feeds out data classifying the data and which is capable of classifying the kind of data by feeding out data of a certain kind basing on the least significant digit and feeding out the data of other kind basing on the most significant digit.

Still further object of the present invention aims at providing a device which feeds out data classifying data and which is capable of classifying the kind of data, that is, in digits assigned for feeding out data, a certain kind of data are fed out with the least significant digit thereof being made coincide with that of the said assigned digits, and other kind of data are fed out with the most significant digit thereof being made coincide with that of the said assigned digits.

The further object and advantage will become clearer by the description given in detail below with reference to the drawings:

DETAILED DESCRIPTION OF THE PREFERRED EMBODIMENTS

Figure 1:
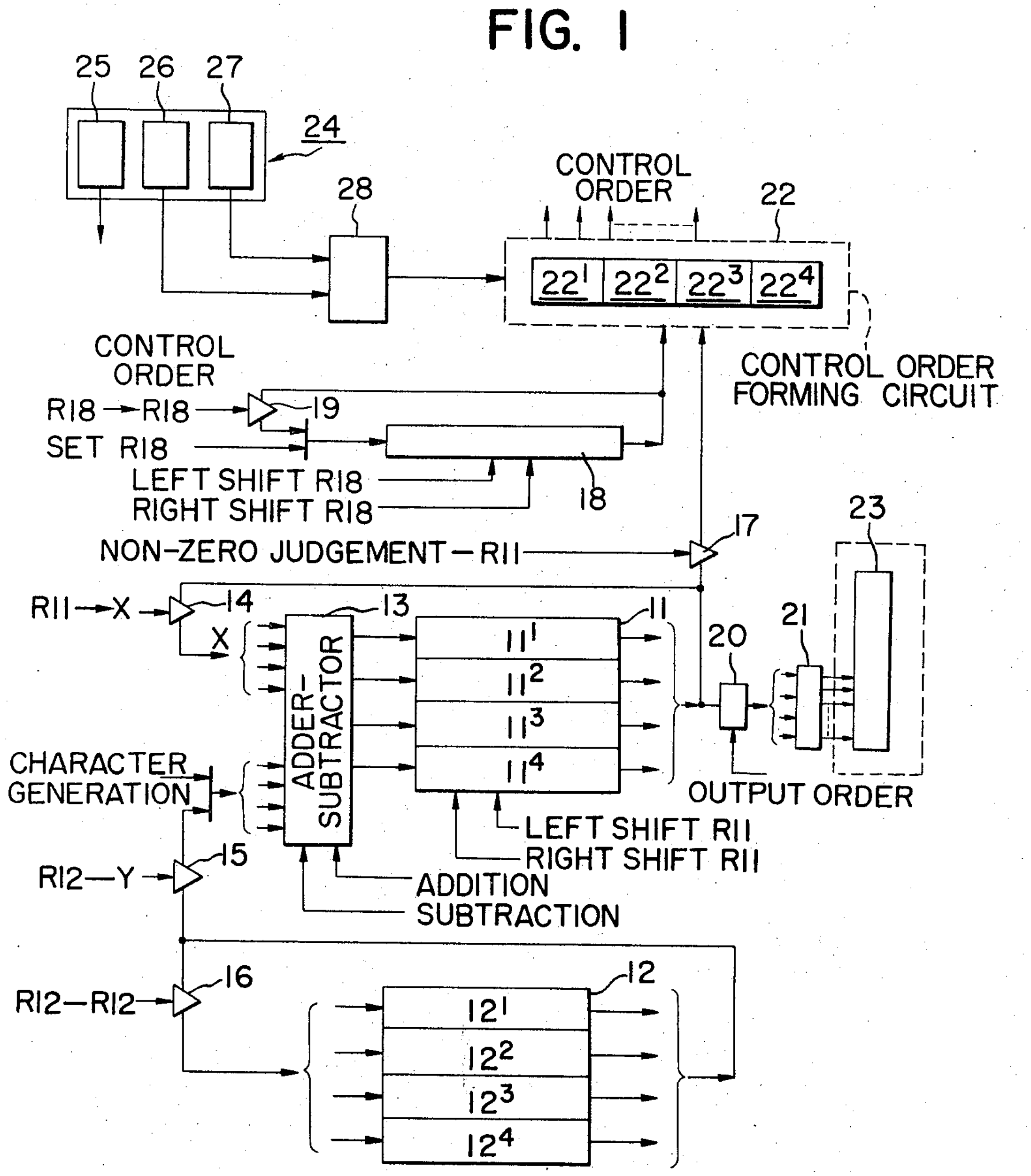
FIG. 1 is a block diagram illustrating a device of the present invention which feeds out data classifying the kind thereof.

FIG. 1 indicates a block diagram of the entire data output device in which the shift registers 11 and 12 are of one digit 4-bit parallel configuration serving to store plural number of digits of literal and digital information as coded information and are consisting of four registers $\mathbf{11^1}$, $\mathbf{11^2}$, $\mathbf{11^3}$ and $\mathbf{11^4}$ and registers $\mathbf{12^1}$, $\mathbf{12^2}$, $\mathbf{12^3}$ and $\mathbf{12^4}$ respectively.

In the present embodiment both registers 11 and 12 comprise 13 digits and are so constructed that the last two digits constitute ones which show the position of decimal point, the third digit from the last indicates a negative sign and the ten digits from the fourth digit from last up to the most significant digit indicate numeral value. However, the most significant digit is a digit which is unrelated to actual display or printing so that, at the time of display, numeral value of only nine digits can be held stored actually.

On the input side of the register 11 is arranged a full adder-subtractor to perform addition and subtraction of its two inputs X and Y. To the gate 14 on the input X side a control order R11 → X is usually being applied instructing to feed the content of register 11 to the input X side, and the output of register 11 is applied to the input X side through the gate 14 so that the content of register 11 is being held circularly. Also to the input Y side is fed with the output of register 12 through the gate 15 by an order R12 → Y instructing to send the content of register 12 to the input Y side when "Addition" or "subtraction" order is printed causing addition and subtraction to be performed in the full adder 13 between the inputs to the said input X side, and the result obtained is held on register 11.

Also to the Y side input, besides the "addition" and "subtraction" order there is an order for "character generation" and if this order is given, a code designated by the order is fed to the Y side. At such a time the X side input is inhibited, also addition and subtraction are not performed and the designated code itself is held on the register 11.

Further, the gate 16 is opened by an order R12 → R12 instructing to feed the output of register 12 to the register 12 so that content of the register 12 is held circularly.

The gate 17 provided in a section of the signalling circuit from a section of the circular loop of the said register 11 to the control order forming circuit 22 performs "No zero discrimination R11" by an order instructing to discriminate whether the content of register 11 is zero or not, and applies the result obtained to the said circuit 22.

The register indicated by numerals 18 operates as a data storing device for designating the digit of information stored in the said register 11 and has a 13-bit time which is of the same length as that of said registers 11 and 12. This register opens gate 19 by an order R18 → R18 instructing to feed the output of register 18 to the input of register 18, and the content is being held circularly, but when an order instructing to set the register 18 is applied, only the bit of digit which corresponds to the time designated by said order is set newly regardless of the previous content.

Also by orders "left shift R18" and "right shift R18" the bit content of the designated time shifts left and right by one bit (one digit) similarly as is the case with the register 11 which shifts left and right by orders "left shift R11" and "right shift R11."

This register 18 itself can be utilized by combining some orders as a counter or used as an output to indicate a decimal point and other informations, but in addition to such purposes the content of 13-digit register is usable as it is for determining the excution designating time for various orders.

For instance, setting the necessary bits only of register 18 to 1, and if controlled to designated this register 18 in determining the excution designating time of next orders e.g. R12 → Y etc., then concerning only the digits which corresponds to the bits set to 1 the order R12 → Y will be carried out.

In the present embodiment, this register 18 is used for determining the shifting period (digit) of the information held in the register 11.

Figure 5:
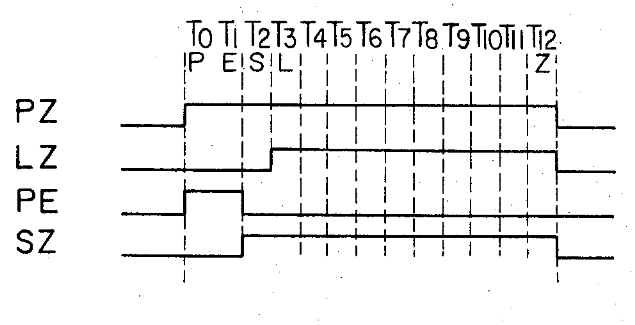
FIG. 5 is a chart showing the time signal used for controlling the device shown in FIG. 1.

In the present embodiment the time for designating the execution of various orders can be obtainable by selecting from among the time shown in FIG. 5 in addition to the selection of bits of the register 18.

PZ: Whole digit time from least significant digit (P) to most significant digit (Z)

LZ: Time from least significant digit of numeral value (fourth from least significant digit L) to (Z)

PE: Time of two decimal digits (P and E)

SZ: Time from negative sign (third from least significant digit S) to (Z)

And, indicated by numeral (20) is a circuit which opens the gate by application of an output order and feeds the content of the register 11 to the decoder 21. Any suitable commercial type of decoder may be employed such as a one of ten Fairchild decoder, series 9301, as described in the Fairchild publication entitled "Fairchild TTL Family" dated October 1970. This decoder 21 decodes the content of register 11 and applies its decoded output to the output device 23 and by means of the said output device the content of register 11 is made be visualized. As an output device a printer or an optical display device such as a cold cathode ray tube etc. can be used.

Indicated by 24 is a keyboard for generating input signals and such a keyboard houses three kinds of key groups. That is, one of the key groups 25 comprises keys (s) for feeding numeral informations of 0 to 9. Another key group 26 comprises those which instruct to give out informations taking the least significant digit as the criterion viz. key for instructing addition, subtraction, multiplication, or division, and the other key group 27 comprises those which instruct to give out informations taking the most significant digit as the criterion such as an equal key etc.

As described above the output of the key groups 26 and 27 which instruct the output condition of information is introduced to the most significant digit criterion output discrimination circuit 28 such as a flip-flop circuit, and in the circuit 28 it is discriminated whether to be fed out from register 11 taking the most significant digit as the criterion or fed out from register 11 to set or taking the least significant digit as the criterion to reset and its discriminating output is fed to the said control order forming circuit 22.

Any suitable type of commercially available control order forming circuit may be employed such as one comprising a control chip $22^1$ manufactured by Hitachi Ltd., Japan, designated as LSI (HD32107P); a read only memory (ROM) $22^2$ manufactured by Hitachi Ltd., Japan, designated as LSI (HD32110P); a data chip $22^3$ manufactured by Hitachi Ltd., Japan, designated as LSI (HD32108P); and a printer chip $22^4$ manufactured by Hitachi Ltd., Japan, designated as LSI (HD32109P). The ROM $22^2$ stores instructions R, G and H, each comprising four bits, respectively, as shown in the following table:

| R-Part R8,R4,R2,R1 | G-Part G8,G4,G2,G1 | H-Part H8,H4,H2,H1, |
|---|---|---|

| INSTRUCTION R | R8 | R4 | R2 | R1 | ABBREVIATION | NAME | NOTE |
|---|---|---|---|---|---|---|---|
| R(0) | 0 | 0 | 0 | 0 | CI | CONTROL — 1 | |
| R(1) | 0 | 0 | 0 | 1 | C2 | CONTROL — 2 | |
| R(2) | 0 | 0 | 1 | 0 | SF | SENSE FLAG | |
| R(3) | 0 | 0 | 1 | 1 | CG | CHARACTER GENERATE | G8,G4,G2,G1 → AR |
| R(4) | 0 | 1 | 0 | 0 | LD | LOAD | AR← BR,CR,MR |
| R(5) | 0 | 1 | 0 | 1 | STR | STORE | AR→ BR,CR,MR |
| R(6) | 0 | 1 | 1 | 0 | SWP | SWAP | AR↔BR,CR,MR |
| R(7) | 0 | 1 | 1 | 1 | SRG | SENSE REGISTER | Sense Non-Zero AR,BR,CR,MR |
| R(8) | 1 | 0 | 0 | 0 | ADD | ADD | AR+1,DL,RNDL, BR,CR,MR |
| R(9) | 1 | 0 | 0 | 1 | SUB | SUBTRACT | AR-1, do. |
| R(A) | 1 | 0 | 1 | 0 | BL | BRANCH & LINK | Address 9 BIT (R1,G,H) |
| R(B) | 1 | 0 | 1 | 1 | do. | do. | do. |
| R(C) | 1 | 1 | 0 | 0 | BU | BRANCH UNCONDITIONALLY | do. |
| R(D) | 1 | 1 | 0 | 1 | do. | do. | do. |
| R(E) | 1 | 1 | 1 | 0 | BC | BRANCH ON CONDITION | do. |
| R(F) | 1 | 1 | 1 | 1 | do. | do. | do. |

| G | R(0);CI | R(1);C2 | R(2);SF | R(4)~R(9) |
|---|---|---|---|---|
| G(0) | HALT | — | (Sense SNZNon-Zero | OR |
| G(1) | (Read RDK Key) | — | do TMR | ONE |
| G(2) | RTN(Return) | Left Shift AR | do. FA | RNDL |
| G(3) | PAGE | Right Shift AR | do. FB | AR |
| G(4) | Set Up TMR | JAM | do. FSW | BR |
| G(5) | Reset TMR | AR WR | do. FLG | CR |
| G(6) | Left-ShiftTMR | Start Print 1 | do. FOF | M1R |
| G(7) | RightShiftTMR | Start Print 2 | do. KST | (M2R) |
| G(8) | — | 1 FZ | (Sense SZ zero) | (M3R) |
| G(9) | 0 → FA | 0 FZ | do. TMR | (M4R) |
| G(A) | 0 → FB | SNZ FZ | do. FA | (M5R) |
| G(B) | 0 → FOF | SZ FZ | do. FB | (M6R) |
| G(C) | 1 → TMR | B-1 → A,A,→ B | do. FSW | (M7R) |
| G(D) | 1 → FA | B+1 → A,A→ B | do. FLG | (M8R) |
| G(E) | 1 → FB | Mult Routine | do. FOF | (M9R) |
| G(F) | 1 → FOF | Div.Routine | do. KST | (M10R) |

| H | EXECUTE TIMING(QP) ABBREVIATION | NOTE |
|---|---|---|
| H(0) | T(t) | Special Timer(TMR) |
| H(1) | P(p) | Decimal Point First Digit |
| H(2) | E(e) | Decimal Point Second Digit |
| H(3) | PE(pe) | |
| H(4) | T26 | T26 |
| H(5) | T27 | T27 |
| H(6) | T32 | T32 |
| H(7) | T33 | T33 |
| H(8) | S(s) | |
| H(9) | X(x) | |
| H(A) | L(1) | LSD |
| H(B) | PZ(pz) | P ~ Z |
| H(C) | SX(sx) | S ~ X |
| H(D) | M(m) | MSD |
| H(E) | LX(lx) | L ~ X |
| H(F) | SM(sm) | S ~ M |

The control chip $22^1$ includes a sequence counter control which addresses the ROM $22^2$ so that an instruction (12 bits) stored in the ROM can be read out. The read out instructions are stored in instruction registers in the control chip $22^1$ and data chip $22^3$. It should be noted that the instruction register in the data chip stores only R and G instructions and the contents of this register are decoded by a decoder in the data chip $22^3$ to control the registers 11 and 12, FIG. 1. Likewise the instructions R and G in the instruction register in the control chip $22^1$ are decoded by a decoder in the control chip to produce variable control orders and, in addition, the instruction H in the instruction register in the control chip is decoded by the decoder to control the register 18 to produce the timing order. The foregoing decoders comprise diode matrixes, respectively, and from each of which control order signals are delivered.

Actual operation of an output device as shown in FIG. 1 which feeds information classifying the kind thereof is described as follows with reference to the flow chart shown in FIG. 2 and shift of informations within the registers 11 and 12.

Figure 2:
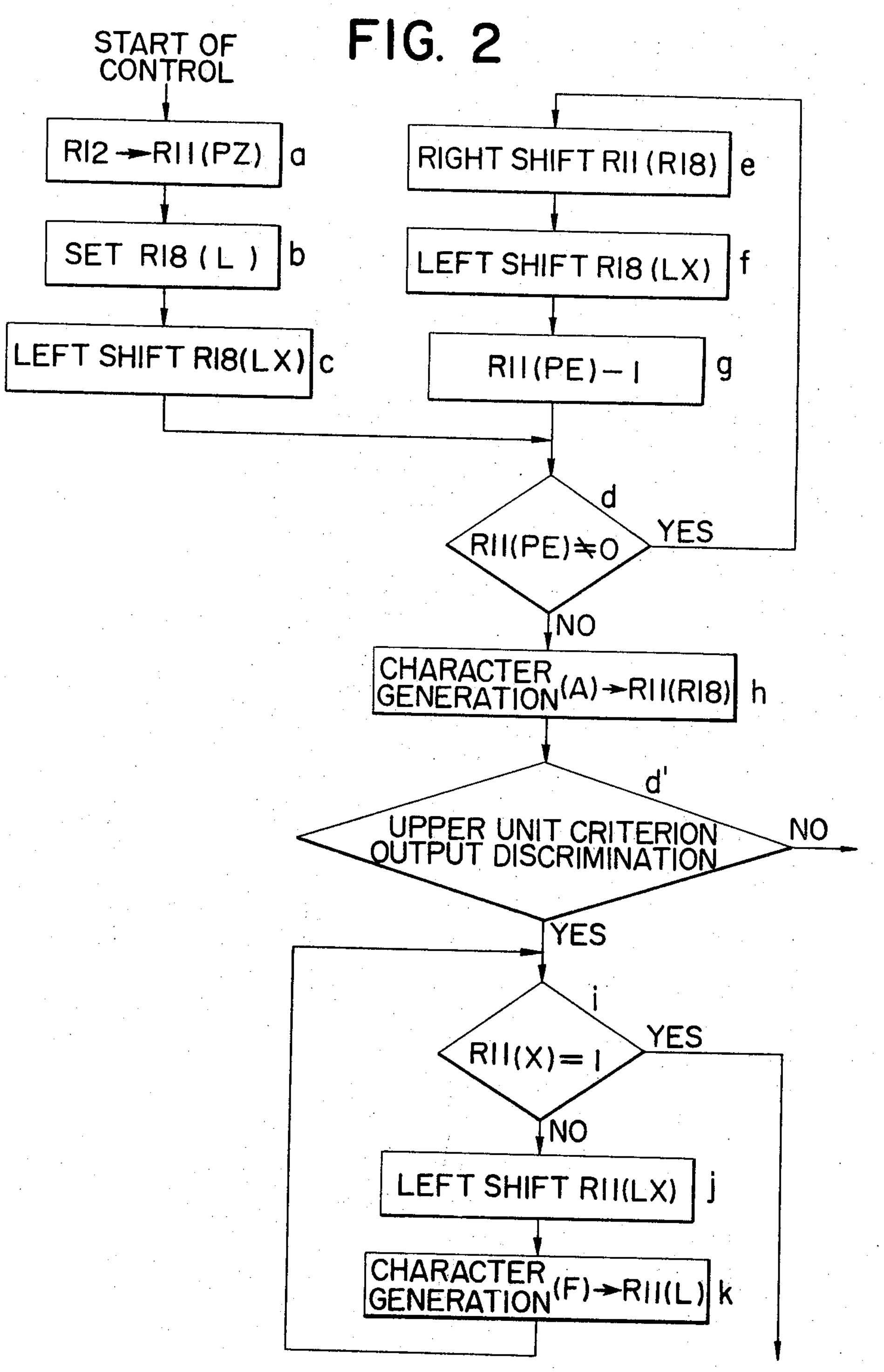
FIG. 2 is a chart showing the operation when the device shown in FIG. 1 is operated.
Figure 3:
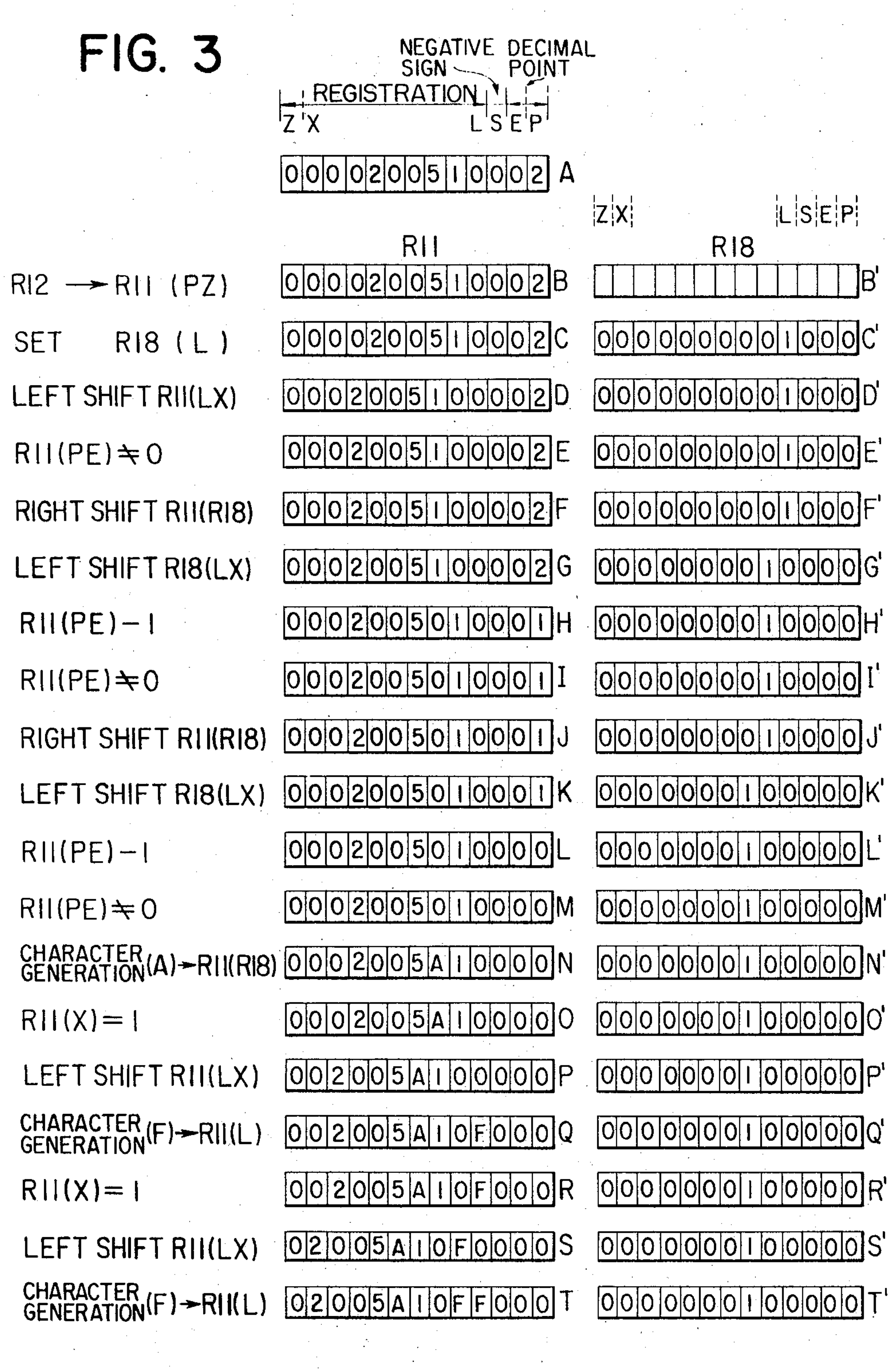
FIG. 3 is an explanatory diagram for explaining the shift of data within the two registers in the device shown in FIG. 1.

In FIG. 2 it is assumed that before beginning control the numerical data (including the decimal point) to be displayed or printed had been held in the register 12 in advance, and that as a specific example of numerical value, a series of numerals in FIG. 3 A of which digit 2 indicates the position of decimal point and the integer section is 000200510, that is, number 2005.10 is taken up.

Next, a description is made sequentially with reference to the flow of control in FIG. 2.

In FIG. 2 *a*, by an order R12 → R11 (PZ) all the units of the above stated data held by register 12 are transferred to the register 11 over the time PZ. At this time, the informations within the register 12 is held as it is so that the content of registers 11 and 12 becomes similar to A as shown in B of FIG. 3.

Next, as shown in FIG. 2*b* by an order "set R18 (L) the L digit of register 18, viz. only the bit which corresponds to the least significant digit of the numerical information is set as shown in C′ of FIG. 3.

Next, proceeding to the step shown in FIG. 2*c*, left shift of L to X digits of register 11 is done. Accordingly, the information in the register 11 becomes as shown in C of FIG. 3. Then proceeding to the step shown by FIG. 2*d*, discrimination is made whether the decimal point digit (time "PE") of the register 11 is zero or not.

In the embodiment, as shown in E of FIG. 3, the numerical value which shows the initial position of decimal point is 2 and not 0, so that the discriminated result becomes YES and jumps to *e* of FIG. 2. Here, as shown in F of FIG. 3, making right shift of the digit information which is higher by one than the digit of register 11 which corresponds to the digit of register 18 having a bit, the shift to the digit of register 11 which corresponds to the digit of register 18 having a bit takes place. Then after proceeding to the next steps FIG. 2*f* and one digit left shift of X to L of register 18 is carried out. And then 1 is subtracted from the numerical value (time PE) which shows the position of decimal point of register 11, and as a result, the "PE" digit of register 11 becomes 1 as in E of FIG. 3. The result of such steps is introduced to the step *d* again to discriminate whether the numerical value which shows the position of decimal point is O or not, and if not 0, again jump is made to step *e* and such respectition is made until the numerical value which shows the position of decimal becomes 0.

In the embodiment, initially "PE" of register 11 was assumed to be numeral value 2, therefore, by repeating cycle of *e*, *f*, *g* and *d* of FIG. 2 2 times, "PE" of register 11 becomes zero as shown in FIG. 3 M. At this time the sixth digit of the content of register 18 is 1, but at the next step *h* a decimal point code (here, A (1010) of hexadecimal code) is formed by an order "character generation" at the digit of register 11 which corresponds to the digit of register 18 of which bit is 1. As a result, the content of register 11 becomes as shown in FIG. 3 N and one digit, a decimal point position is inserted in the corresponding position. The above described steps *b* to *h* in FIG. 2 are those for inserting a decimal point code into the corresponding digit, but if the information held by register 12 is an information to be fed out taking the least significant digit as a criterion, for instance, the addition key and/or subtraction key are to be pushed, the discriminated result of the next step *d′* in FIG. 2 becomes NO and an output order is given by the control order forming circuit 22.

By this output order, gate 20 opens, and an information as shown in N of FIG. 3 is sent out by the output device 23 through the decoder 21. At this time if the content of register 11 is sent out as it is, it will be sent out as 002005.10. Of course this may be said to have surely taken the least significant digit as a criterion, but it is preferable to send out as 2005.10 suppressing unnecessary more significant zeros.

To perform this zero suppression, it may be achieved either by introducing the output of gate 20 to a publicly known zero suppression circuit (not shown) then applying the output of said zero suppression circuit to a decoder 21, or by making left shift of register 11 having content similar to that as shown in N of FIG. 3 until the effective digit positions at MSD of register 11, and then making right shift of register 11 by one digit and at the same time applying F code 1111 from Y input and when the data positioned in the original state making the shift stop there. Then, the three unnecessary zeroes positioning higher than the effective digit (in this case 2) are converted into F code.

Accordingly by arranging the decoder 21 in a manner that it would not decord such an F code, unnecessary more significant zeroes as described will not be fed out by the output device.

Figure 4:
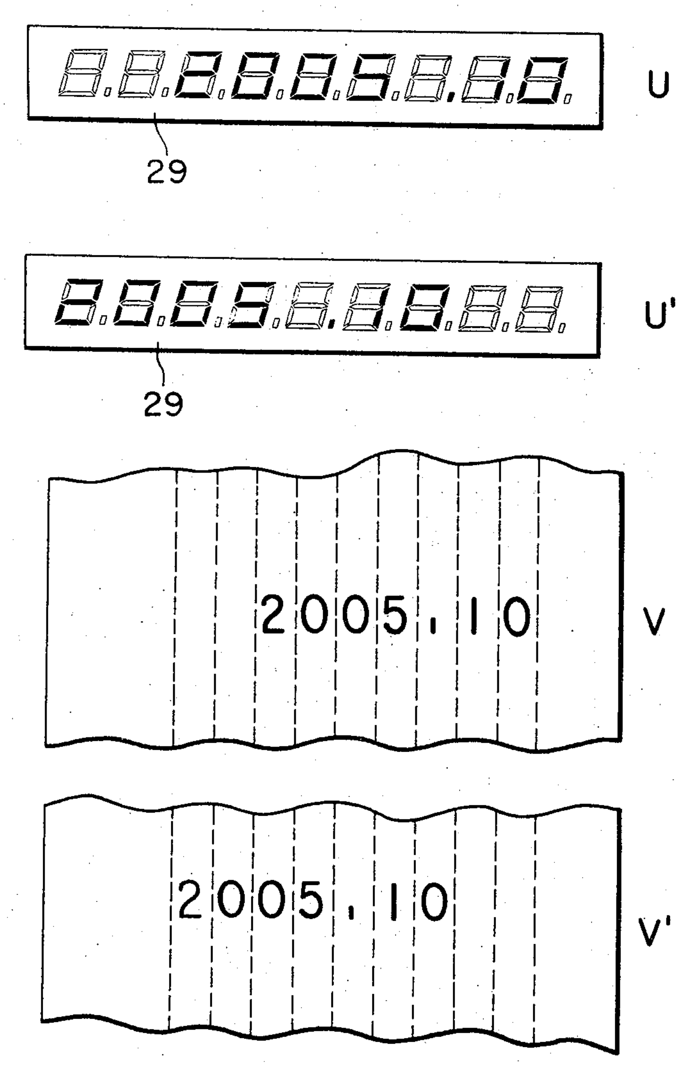
FIG. 4 is a diagram showing the data fed out taking the most significant digit or least significant digit as the criteria, in which U and U' indicate the output condition by an optical display device, V and V' indicate the condition printed on recording paper by printing device, U and V indicate the condition fed out taking the least significant digit as the criterion, and U' and V' indicate the condition fed out taking the most significant digit as the criterion.

U and V′ in FIG. 4 are diagrams showing conditions of an information fed out in this manner taking the least significant as a criterion, and U shows a case where in an optical display device 29 having 9-digit display capacity the least significant digit of the display device 29 was made coincide with the least significant digit of the information to be displayed.

V of FIG. 4 indicates the date printed on recording paper 30 in a case where a printer was used as an output device, and the least significant digit of printable nine digits and the low ranking unit of printed information are printed so as to be coincident.

On the other hand, if such data viz. the numerical value 2005.01 in register 11 is one obtained by operating a key which instructs to feed out taking the most significant digit as a criterion such as equal key 27, the discriminated result of the next step becomes YES, and the step advances farther to FIG. 2*i*.

The following steps *i* to *e* in FIG. 2 describe steps for rearranging the information held in register 11 taking the least significant digit as a criterion as shown in M of FIG. 3 so as to be arranged taking the most significant digit of register 11 as a criterion and suppression of unnecessary information at that time. When a decimal point code is inserted at step *d*, then the procedure proceeds to the step shown in FIG. 2*i*, and discrimination is made whether there is a numerical value other than 0 is or not at the X digit of register 11 viz. at the most significant digit of the information to be displayed or printed, that is, whether each bit of X digit comprises 1 or not.

In the embodiment, the X digit is 0 so that, the discriminated result becomes NO and the procedure proceeds to the next step. Here, L to X digits of register 11 are shifted leftward by one digit, and at the next step at the least significant digit L of the numerical information a suppression code i.e. an F code 1111 is disposed. After such steps return to step *i* again where discrimination is made whether there is a numeral other than 0 or not at the X digit, and if not 0 the procedure proceeds to step *j* again. Such operation is repeated until the X digit of register 11 is not 0. In the embodiment more significant two digits were 0 (FIG. 3 0) so that by repeating cycle of *i*, *j* and *k* of FIG. 2 two times the X digit of register 11 becomes zero as shown in FIG. 3 (T).

At this time, 2 digits of F code have been inserted at the less significant digits of the numerical information, but this is equal to the number of shifted digits viz. the numerical information was shifted as much to more significant digit, and stored after shifting the most significant digit of the information to the most significant digit (X digit) which relates to the output of register 11, therefore, in displaying or printing, the said information is fed out taking the most significant digit as a criterion, and since the shift had been made for such purpose, the zero appeared at the less significant digit of information can be suppressed so that an output order is applied from the control order output circuit 22 to the gate 20.

Due to this output order, the gate 20 is opened and an information as shown in FIG. 3 T is fed out from register 11 by means of the output device 23 via decoder 21.

U' and V' in FIG. 4 are diagrams showing the condition where an information is fed out in this manner taking the most significant digit as a criterion, and U' shows a display on an optical display device 29 having 9-digit display capacity when the most significant digit of the display device 29 and the most significant digit of the information to be displayed were made coincident.

As described above, in the present invention it is possible to discriminate the kind of information in feeding out the information by means of an output device and is very convenient.

Figure 6:
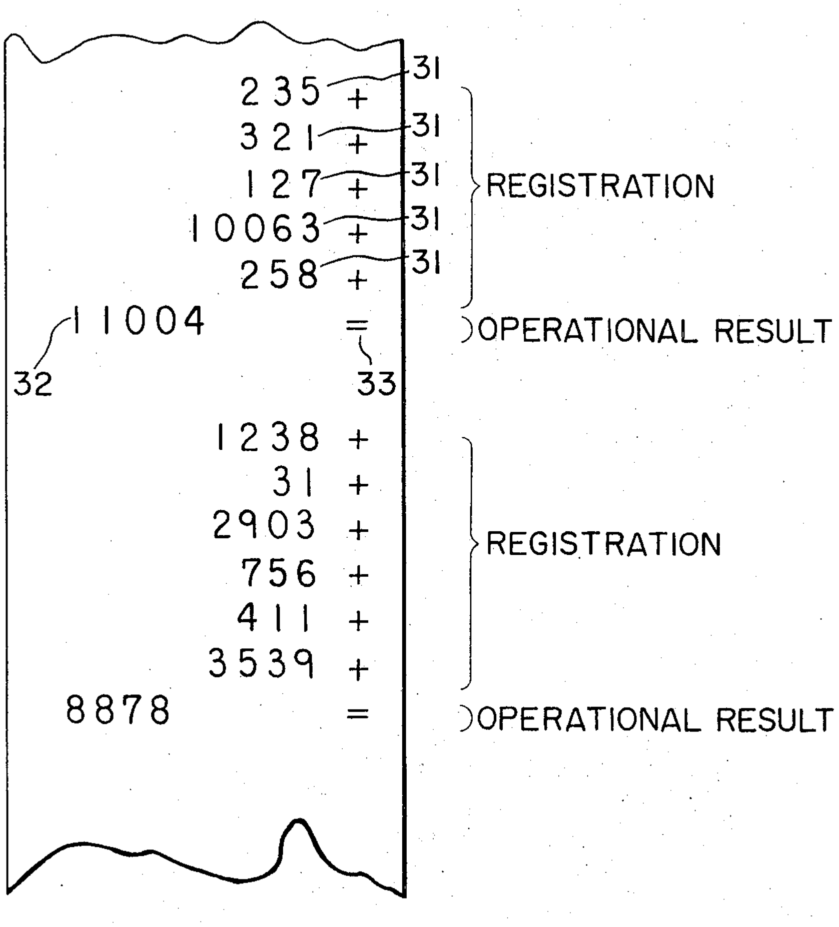
FIGS. 6 and 7 are explanatory diagrams showing the condition of output printed by kinds of data on recording paper, with FIG. 6 indicating the condition where the operational results are fed out taking the most significant digit as the criterion, and the other data fed out taking the least significant digit as the criterion, which FIG. 7 being an explanatory diagram showing the condition in which the data was fed out taking the most significant digit as the criterion and other data were fed out taking the least significant digit as the criterion.

FIG. 6 shows a series of informations printed by a printer and the operand and the operated number 31 are recorded in coincidence with the least significant digit of nine digits prepared for printing, and the operational results 32 are recorded in coincidence with the most significant digit of nine digits prepared for printing. Incidentally, what is indicated by numeral 33 is a recording digit provided for recording the kind of operational instructions.

Accordingly, the operational result can be recognized discriminated clearly from the operand and operated numbers.

Figure 7:
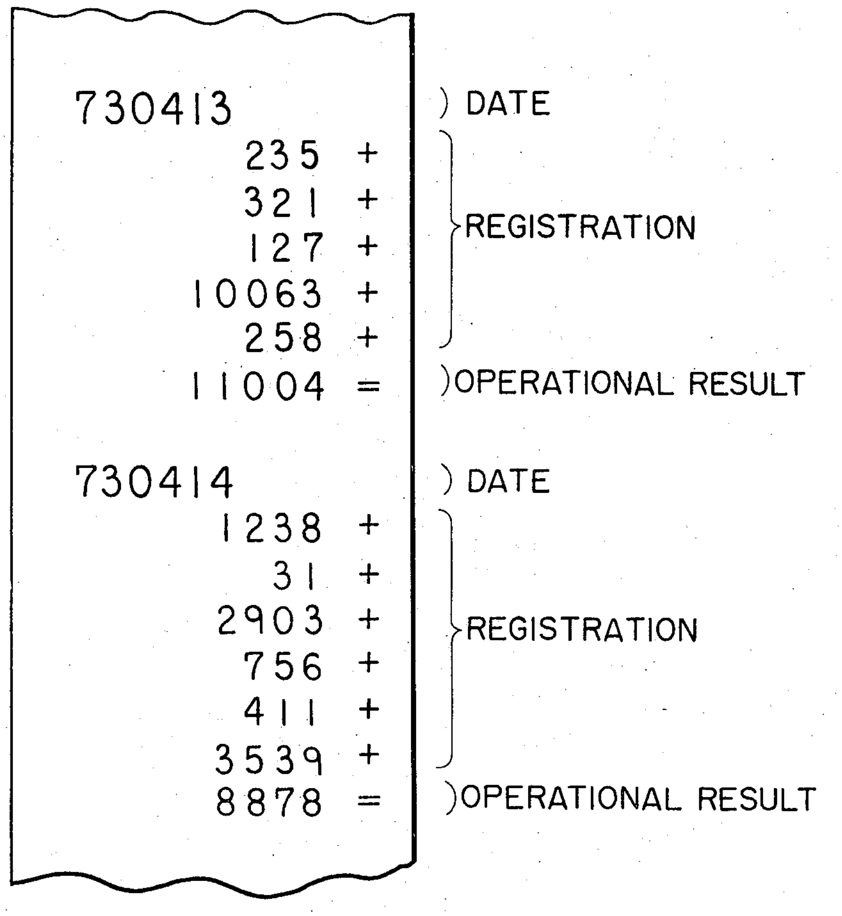

Also, the informations to be classified are not limited to those stated above, and date and collected informations can be processed. For instance, as shown in FIG. 7, the date is fed out taking the most significant digit as the criterion and the collected informations and collected results are fed out taking the least significant digit as the criterion.

Figure 8:
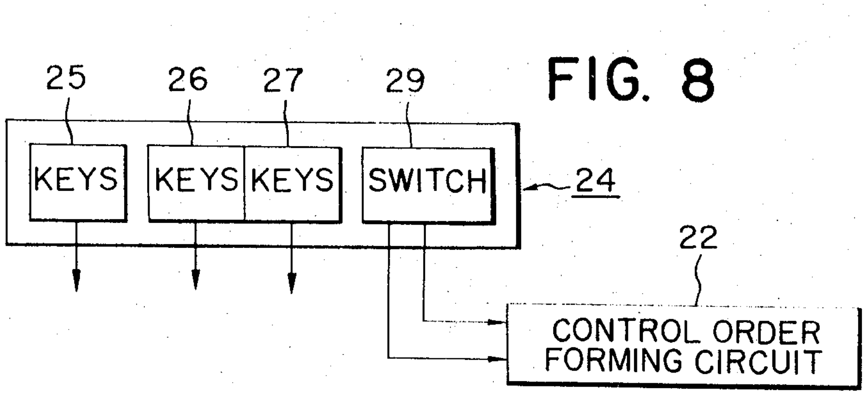
FIG. 8 depicts a block diagram in variation of a keyboard as shown in FIG. 1.

However, in such case, it is preferable to provide a separate selection switch 29 as shown in FIG. 8 so as to enable that when the switch 29 is in a certain condition a signal instructing to make the most significant digit as the criterion is applied to the control order forming circuit 22, and when said switch is in other condition a signal to make the least significant digit as the criterion is applied to the control order forming circuit 22 instead of using the output from the key groups 26 and 27 as the input to the most significant digit criterion discrimination circuit 28 as shown in FIG. 1.

In FIG. 8 component parts indicated by the same numerals as those in FIG. 1 are the same component means, and some components are not shown.

Accordingly, when the date is to be recorded, the operator operates the key 25 after setting the said switch to a certain condition, and in otherwise cases, keys 25, 26 and 27 are operated after putting the said switch in the other condition.

We claim:

1. An output device for a calculator for classifying and feeding out data comprising:

a key board including data entry keys and instruction keys for entering instruction entry signals;

operating means for executing an operation in accordance with the data entered by the entry keys and the instruction entered by the instruction keys;

data storing means for storing the data entered by the entry keys and operational result produced by the operating means;

output means having a predetermined number of output positions for feeding out the data in the storing means;

discriminator means for discriminating a most significant digit designating signal by which the instruction signal entered by the instruction keys designates to output the data in the storing means so that the most significant digit of the data is in alignment with a first specified digit of the output digits of the output means and a least significant digit designating signal by which the instruction signal entered by the instruction keys designates to output the data in the storing means so that the least significant digit of the data is in alignment with a second specified digit of the output digits of the output means; and means for supplying to the output means the data in the storing means aligning the most significant digit of the data with the first specified digit of the output digits of the output means when the discriminator means discriminates the most significant digit designating signal and for supplying to the output means the data in the storing means aligning the least significant digit of the data with the second specified digit of the output digits of the output means when the discriminator means discriminates the least significant digit designating signal.

2. An output device as defined in claim 1, wherein the output means comprises a printer.

3. An output device as defined in claim 1, wherein the output means comprises an optical display device.

4. An output device as defined in claim 1, wherein an order signal having the most significant digit designating signal is a signal for designating, to require the operational result.

5. An output device as defined in claim 1, wherein the sorting means comprises shifting means for storing the operational result and the entered data aligning the least significant digit thereof with that of output digits of the storing means and for shifting the operational result and the entered data to align the most significant digit thereof with that of output digits of the storing means when the discriminator means discriminates the most significant digit designating signal.

6. An output device as defined in claim 5, wherein storing means comprises means for converting into a redundancy code the digit information of a less significant digit or digits of the information stored in the storing means by the digit number corresponding to the number shifted to align the most significant digit.

* * * * *